United States Patent
Bampi

(10) Patent No.: US 9,475,941 B1
(45) Date of Patent: Oct. 25, 2016

(54) FORMULATION OF WOOD WASTE AND RECYCLED THERMOPLASTIC COMPOSITE WITH NANOMETRIC ADDITIVES AND RESULTING PRODUCT

(71) Applicant: Madeplast Indústria e Comércio de Madeira Plástica LTDA, Curitiba (BR)

(72) Inventor: Guilherme Hoffmann Bampi, Ma (BR)

(73) Assignee: MADEPLAST INDÚSTRIA E COMÉRICO DE MADEIRA PLÁSTICA LTDA, Curitiba (BR)

( * ) Notice: Subject to any disclaimer, the term of this patent is extended or adjusted under 35 U.S.C. 154(b) by 0 days.

(21) Appl. No.: 14/933,272

(22) Filed: Nov. 5, 2015

(51) Int. Cl.
*C08L 97/02* (2006.01)
*C08L 23/06* (2006.01)

(52) U.S. Cl.
CPC ............... *C08L 97/02* (2013.01); *C08L 23/06* (2013.01)

(58) Field of Classification Search
CPC ....................................................... C08L 97/02
USPC ................................... 524/13, 587; 977/777
See application file for complete search history.

(56) References Cited

U.S. PATENT DOCUMENTS

2011/0263758 A1* 10/2011 Wu .................... C08J 5/045 524/14
2012/0225976 A1* 9/2012 Bampi ................. C08L 97/02 524/13

OTHER PUBLICATIONS

Farahani and Banikarim (BioResources 8(4), 2013, 5715-5720).*

* cited by examiner

*Primary Examiner* — Vu A Nguyen
(74) *Attorney, Agent, or Firm* — Brian J. Pangrle

(57) ABSTRACT

A thermoplastic composite material and resulting product can be utilized in the wood-plastic composite and plastic lumber industries (WPC), for example, as pellets and extruded parts of physical and chemical characteristics intended for structure and/or finishing applications. Such a thermoplastic composite material and/or resulting products can be recycled and/or include recycled material for the good of the environment. Nanometer-sized components were used to obtain a final product with 30 to 54 percent wood content and improved resistance against fungi and bacteria, producing an optimized formulation with increased wood residue amounts, greater mechanical resistance, greater weather resistance, and longer durability of plastics.

17 Claims, No Drawings

FORMULATION OF WOOD WASTE AND RECYCLED THERMOPLASTIC COMPOSITE WITH NANOMETRIC ADDITIVES AND RESULTING PRODUCT

BACKGROUND

Related to the technological field of composites, are documents of Brazil (PI0103654-8 and PI0402485-0), of the US (U.S. Pat. No. 5,516,472, U.S. Pat. No. 6,210,616, U.S. Pat. No. 6,479,002, and US2010319144), and of Europe and China (EP2216365 and CN101698750). Further are the Brazilian patent application BR 10 2012 004500 1 and the US published patent application US20120225976 A1 to Bampi, which is incorporated by reference herein.

SUMMARY

A thermoplastic composite material and resulting product can be utilized in the wood-plastic composite and plastic lumber industries (WPC), for example, as pellets and extruded parts of physical and chemical characteristics intended for structure and/or finishing applications. Such a thermoplastic composite material and/or resulting products can be recycled and/or include recycled material for the good of the environment. Nanometer-sized components were used to obtain a final product with 30 to 54 percent wood content and improved resistance against fungi and bacteria, producing an optimized formulation with increased wood residue amounts, greater mechanical resistance, greater weather resistance, and longer durability of plastics.

DETAILED DESCRIPTION

This description is not to be taken in a limiting sense, but rather is made merely for the purpose of describing the general principles of the implementations. The scope of the described implementations should be ascertained with reference to the issued claims.

Technology described herein demonstrates the improvement of thermoplastic composite and resulting product applied to the wood-plastic composite and plastic lumber industries (WPC), which obtain pellets and extruded parts of excellent physical and chemical characteristics intended for structure and/or finishing applications, including recycling of materials. Nanometer-sized components were used in order to improve resistance against fungi and bacteria, producing an optimized formulation with increased wood residue amounts, greater mechanical resistance, greater weather resistance, and longer shelf life.

The WPC technical field is familiar with the fact that the plastic timber industry has continuously provided improved products able to replace many of the materials traditionally used in the production of goods and products. Wood materials, for example, are already being replaced by a wide range of composites.

Composite materials are defined as materials formed by two or more components that present distinguished compositions, structures and properties, separated by an interface. The production of composites aims to combine different materials in order to produce a device superior to those consisting of single components. Composites developed for optical, structural, electrical, optoelectronic, chemical, and other applications are easily found in modern devices and systems. (Reference: UFMG Polymers and Composites Engineering Laboratory—http://www.demet.ufmg.br/docentes/rodrigo/compositos.htm)

This technology combines design needs and material properties according to the final application. For instance, if a composite product must be designed to provide structural resistance and thermo-acoustic insulation, it will be made of materials capable of serving that particular purpose.

Furthermore, it is possible to aggregate materials resulting from the disposal of industrial processes, such as sawmill residues, which can be redirected to production process as load; discarded paper and cardboard, which can be reprocessed into pulp and molded into other products, ranging from modular structures for furniture to fibers intended for composite panel structures. Recycling is an important feature of composite materials.

Previous designs revealed disadvantages, limitations, and expensive fabrication drawbacks caused by the utilization of more plastic and less wood in order to achieve durability, avoid wood look products, and discard the utilization of renewable resources.

Formulations of wood waste and recycled thermoplastic composites with nanometric additives and resulting products were developed to overcome drawbacks, limitations, and disadvantages seen in composites and products currently available, as they can introduce improvements to thermoplastic composite and the resulting products intended for structure and/or finishing applications. Nanometer-sized components were used in order to improve resistance against fungi and bacteria, producing an optimized formulation with increased wood residue amounts, greater mechanical resistance, greater weather resistance, and longer shelf life; a product as hard and resistant as natural wood, a recycled material that displays the beauty of natural wood, made with nanoparticle technology widely used and approved by the FDA (American health authority).

The solutions available present technical issues that have been addressed in the following manner:

a) Current compositions are not resistant to bacteria, which causes wood degradation. Consequently, a lesser amount of wood residue and an increased proportion of thermoplastic are required, unless nanometric silver is introduced;

b) Current compositions are not resistant to fungi, which causes wood degradation. Consequently, a lesser amount of wood residue is required and an increased proportion of thermoplastic, unless nanometric silver is introduced;

c) Parts made of WPC currently available require higher thermoplastic percentages in their composition in order to improve mechanical and weather resistance, and compensate for the short shelf life of wood residue often attacked by fungi and bacteria, which is addressed herein by introducing a greater amount of wood residue that presents the same shelf life of WPC available and reducing thermoplastic amounts.

Silver nanoparticle additives present risk-free dimensions that have been added to the original formulation along with zinc in order to fill up small gaps between wood fibers and plastic. Nanoparticles are capable of adhering to bacterial cells and destroy them.

The improvements achieved by using nanometer-sized silver and zinc in the wood and plastic composite formulation provide microbiological protection against bacteria and fungi, greater weather resistance and increased durability of plastic in compositions of higher wood percentages and greater mechanical resistance.

Metallic additives form islands of Ag or Zn particles, where silver acts as bactericidal, and zinc as fungicidal, which maximize the properties of the product.

Based on various trials, the following range of components used to achieve a better composition were determined:

Protective Master (Anti-UV Nanoparticles and Antioxidant): 1% to 3%;
Internal lubricant: 1% to 4%;
External lubricant: 2% to 8%;
Recycled HDPE: 26% to 43%;
Mineral load: 13% to 20%;
Wood Flour: 30% to 54%; and
Pigment: 3% to 5%.

A protective master consists of: 6 parts of Nanox Clean brand Nanoparticles (consisting of half silver, half zinc) or similar, 5 parts of Anti-UV, 3 parts of Antioxidant, 10 parts of High Density Polyethylene (HDPE) Crystal. These ratios were obtained through theoretical analysis of the desirable features of the product and the technical specifications of each component. The utilization rate ranged from 1% to 3%, according to the desired weather resistance and the wood concentration present in the composition. As wood amounts increase, more protective master is needed in order to ensure material durability. The minimum amount was determined through testing. The product does not perform as expected if smaller amounts are used. Amounts greater than recommended result in waste of material and do not influence the performance of agents.

The internal lubricant selected consisted of a mixture of fatty acid ester complex, modified at dropping point comprised between 71 and 86° C., STRUKTOL TPW-113® brand or equivalent. The internal lubricant is chemically compatible with the polymer and functions at molecular level. The internal lubricant is applied to reduce friction between polymer molecules and van der Waals forces. As a result, energy consumption required for processing and the viscosity of the composite present inside the machine are reduced. The minimum amount was determined through testing. If less than the minimum recommended amount is applied, cracked parts, low production speed, and inhomogeneous product is obtained. If more than the maximum recommended amount is applied, material is wasted.

The external lubricant selected consists of polyethylene scale with melting point comprised between 95 and 105° C.: The external lubricant performs by creating an interface between the polymer bead and the metal surface of the equipment, reducing friction. It delays the fusion point of the extruded material and controls the flow of melted mass. The best empirical results for material processability were obtained when the external lubricant dosage was twice as much as the dosage amount of the internal lubricant. The lower the percentage of external lubricant in the formulation, the slower and more difficult material processing will be. The minimum amount was determined through testing. If less than the minimum recommended amount is applied, the parts are deformed and production decreases. If more than the maximum recommended amount is applied, the parts are stained during the production process, deemed aesthetically unacceptable.

Recycled HDPE (High Density Polyethylene) was used during the process in lieu of virgin HDPE. HDPE was prepared with a HDPE blend of industrial cutting (homogeneous) and post-consumer waste HDPE (heterogeneous). The proportion of homogeneous HDPE ranged from 12% to 30% of total HDPE, the remaining amount consisted of heterogeneous HDPE (post-consumer). The use of higher concentrations of homogeneous HDPE was used when the quality of the heterogeneous HDPE was low or when a large-scale heterogeneity (wide variation in quality) was present. The use of a greater concentration of HDPE in the compound provides more flexibility, whereas a lower concentration makes the material more rigid and brittle. Therefore, the best results obtained for the formulation ranged as demonstrated herein. The minimum amount was determined through testing. If less than the recommended amount is applied, the formulation does not homogenize. If more than the maximum amount is applied, expansion variation of the material occurs.

The wood flour used consisted of pine and/or eucalyptus, and/or post-consumer (undetermined species) wood dust mixtures obtained from coil waste, pallets, cabinets and/or wooden furniture. The minimum amount was determined through testing. If less than the recommended amount is applied, greater expansion variation occurs. If more than the maximum amount is applied, the material does not homogenize.

The mineral load used consisted of talc and/or magnesium silicate, and/or calcium carbonate. The minimum amount was determined through testing. If less than the recommended amount is applied, the resistance of the part drops. If more than the maximum amount is applied, the part becomes very brittle and significant wear of the machine thread occurs.

Optionally, the composition may be aggregated to the coupling agent, which consists of maleic anhydride grafted onto polyolefinic polymer; a mixture of modified fatty acid ester complex; additional photoprotective agent such as amine type photostabilizer; other primary and secondary antioxidants agents, such as phosphonites process stabilizers, blocked phenolic compounds, secondary aromatic amines, aromatic amines, and co-stabilizers that contain sulfur or metal deactivators. In addition, the composition may present flame retardant additives, blowing and desiccant agents, defective parts returns (recycled defective parts), among others.

The pigment consists of a coloring agent ("masterbatch"), which may be a composite of organic and inorganic pigments, and be entirely removed from the formulation if the part is intended for hidden structural applications that do not involve visual exposure.

The research and development obtained the following as a preferred formulation:

Protective Master (Anti-UV Nanoparticles and Antioxidant): 1% to 2%;
Internal lubricant: 1% to 3%;
External lubricant: 2% to 6%;
Recycled HDPE: 30% to 40%;
Mineral load: 13% to 18%;
Wood Flour: 40% to 50%; and
Pigment: 3% to 5%.

The addition of components to the formulation during manufacturing occurs simultaneously through an injector that combines all components like a cake batter.

The following physical properties are for examples of plastic timber obtained from various compositions introduced herein:

Durability: 50 years (average).
Warranty: 10 years against fungi and pests.
Maintenance: water and mild soap. Painting or varnishing is not required.
Fire Resistance: reaction to fire is similar to the reaction hardwood presents.
Impact Resistance: good impact resistance.
UV and Fading Resistance: after 2,000 hours of intense UV exposure in a Xenon chamber, the delta-E did not reach 6, which corresponds to a good result. The UVB test demonstrated that after 2,000 hours of exposure, the delta-E did not reach 1, which corresponds to an excellent result.

Water Absorption: almost nil (0.6% mass in the ABNT test, submerged for 24 hours), which means the product is appropriate for submerged applications.

Determination of coefficient of friction (COF): Evaluation performed in a Universal Testing Machine EMIC, with mobile beam at 150 mm/min clearance speed and 100 mm scale interval. The test was performed on two sets of "Aitá board" and "Tefé board" samples: one set was subject to 23+2° C. and 50±5% RH; the other set was tested by applying a thin layer of water on each sample. The evaluation was performed on the surface of the samples and rubber plates were used as covering for the drag device. Testing based on ASTM D 1894-11e1 norm, testing equipment that complies with norm model C. Drag device weight: 200 gf.

Results:
Samples: "Tefé" Board
Static Friction Coefficient: Average of 5 test samples, 1.24
Dynamic Friction Coefficient: Average of 5 test samples, 1.16
Samples: "Tefé" Board Subject to Water
Static Friction Coefficient: Average of 5 test samples, 1.19
Dynamic Friction Coefficient: Average of 5 test samples, 1.14
Samples: "Aitá" Board
Static Friction Coefficient: Average of 5 test samples, 1.16
Dynamic Friction Coefficient: Average of 5 test samples, 1.12
Samples: "Aitá" Board Subject to Water
Static Friction Coefficient: Average of 5 test samples, 1.29
Dynamic Friction Coefficient: Average of 5 test samples, 1.28

Shear Resistance: Shear resistance evaluation testing on plastic materials, in compliance with NBR 7190:1997. Evaluation performed in a Universal Testing Machine EMIC, at 2.5 MPa/min load rate. The test was performed on two sets of "Aitá board" samples: one set was subject to 23+2° C. and 50±5% RH; the other set was subject to saturated humidity until constant mass was obtained.

Results:
"Aitá" Board Samples
Maximum Stress (MPa): Average of 5 test samples, 15.76
Samples: Saturated "Aitá" Board
Maximum Stress (MPa): Average of 5 test samples, 14.47

Physical Testing Performed Under Other Environmental Conditions of Laboratory Testing: Temperature: 23±2° C. and Relative Humidity: 50±5%:

Shore D Durometer Hardness, ASTM D2240-05: Result: Shore D Durometer Hardness, medium 64

Tensile Strength of Plastics, ASTM D638-10: Result: Tensile Modulus of Elasticity, MPa: 3848
Tensile Breaking Point, MPa: 13
Elongational flow, %: 0.6

Flexural Strength of Plastics, ISO 178:2010—Method A: Result: Maximum Flexural Strength, MPa (average) 33
Modulus of Elasticity, MPa (average) 3820

Deflection Temperature Specification, ISO 75:2004 (E)—Part 1—Method A—Horizontal and CEAST HDT VICAT Serial 18774 Equipment. Testing conditions: Initial temperature of the test: 30° C. in silicone immersion. Heating rate: 120° C./h. Test load requested by the client: 1.80 MPa. Span used: 64 mm:
Result: Deflection Temperature—HDT: 53.08° C.

Determination of Softening Temperature of Plastics, ASTM D1525-09 and CEAST HDT VICAT Serial 18774 Equipment. Initial temperature of the test: 30° C. in silicone immersion. Test load requested by the client: 10 N. Heating rate applied: 120° C./h—Rate B:
Result: Softening Temperature Specification—VICAT; 123.4° C.

Accelerated weathering (Xenon Test) and Color Variation Specification after 500, 1.000, 1.500, and 2.000 hours ASTM D2565-99 (Reap. 2008), ASTM G155-Cycle 1. Q-Sun Xe-3-HS Weathering Chamber, serial number 16-06-81-47 X3HS:

Results: Accelerated Weathering—Xenon Test—Color Variation Specification ASTM D2244-11:

| "Jatobá" Board | L* | a* | b* | Δ L* | Δ a* | Δ b* | Δ E* |
|---|---|---|---|---|---|---|---|
| S under exposure (Ave) | 45.20 | 9.56 | 13.72 | | | | |
| After 500 h of exposure (Ave) | 47.99 | 11.36 | 10.50 | 2.79 | 1.80 | −3.22 | 4.62 |
| After 1,000 h of exposure (Ave) | 49.65 | 12.05 | 11.02 | 4.45 | 2.49 | −2.70 | 5.77 |
| After 1,500 h of exposure (Ave) | 49.13 | 12.38 | 10.96 | 3.93 | 2.82 | −2.76 | 5.57 |
| After 2,000 h of exposure (Ave) | 49.22 | 12.35 | 10.96 | 4.02 | 2.79 | −2.76 | 5.62 |

Visual Evaluation: Significant visual color alteration was shown after 500 hours of exposure to weathering, which remained similar during other periods of exposure (1,000, 1,500, and 2,000 hours).

Breaking load, bending and compression evaluation testing of different geometry and length profiles.

Methodology: Tests performed on structural parts of pillars under compression, beams and wainscoting under bending stress.

Breaking load results (rupture load or loss of stability) Kgf:

| Pillar 150 Average: 6,618 | Pillar 220 Average: 5,713 | Pillar 300 cm Average: 3,903 |
|---|---|---|
| Board Long Sanded 150 cm Average: 5,265 | Board Long Sanded 220 cm Average: 4,809 | Board Long Sanded 300 cm Average: 2,908 |
| Beam Long Sanded 300 cm Average: 330 | Beam Long Sanded 300 cm Average: 404 | Beam Long Sanded/Reinforced 300 cm Average: 513 |
| Pillar Robust Long 220 cm Average: 15,386 | Pillar Robust Long 300 cm Average: 8,080 | |
| Pillar Refinished Sanded 220 cm Average: 8,899 | Pillar Refinished Sanded 300 cm Average: 7,042 | |
| Wainscot 100 cm Average: 12 | Wainscot 50 cm Average: 24 | |

Microbiological Testing of Bacteria Resistance using Agar Disk Diffusion Method with Inoculation: 4.5×106

UFC/ml of *Escherichia coli*. The test was able to prove that the samples present a larger inhibition halo, either on a worn surface (sanded) or on a non-worn surface. The antimicrobial used in samples also proved to be efficient in amounts greater than 99.99%, even in low concentrations. After 48 hours, halo diffusion was not seen.

Microbiological Testing of Bacteria Resistance using Agar Disk Diffusion Method with Inoculation: 104 UFC/ml of fungi. The test was able to prove that the samples present a greater zone of inhibition when exposed to inoculated fungi, with no surface growth and efficiency up to 99.99%.

The invention claimed is:

1. A composite material comprising:
   1 to 3 percent of a protective master that comprises 6 parts of nanoparticles of 50 percent silver and 50 percent zinc, 5 parts of anti-UV material, 3 parts of antioxidant material, and 10 parts of high density polyethylene (HDPE) crystals;
   1 to 4 percent of an internal lubricant that comprises a mixture of fatty acid esters modified at a dropping point temperature between 71 and 86° C.;
   2 to 8 percent of an external lubricant that comprises polyethylene scale with a melting point temperature between 95 and 105° C.;
   26 to 43 percent of recycled high density polyethylene (HDPE);
   13 to 20 percent mineral material;
   30 to 54 percent wood flour; and
   3 to 5 percent organic and inorganic pigments.

2. The composite material of claim 1 wherein the wood flour comprises wood powder.

3. The composite material of claim 1 comprising a thermoplastic composite.

4. The composite material of claim 1 wherein the wood flour comprises wood waste.

5. The composite material of claim 1 wherein the high density polyethylene crystal comprises recycled high density polyethylene crystal.

6. The composite material of claim 1 wherein the mineral material comprises at least one member selected from a group consisting of talc, magnesium silicate and calcium carbonate.

7. The composite material of claim 1 wherein the wood flour comprises pine wood flour.

8. The composite material of claim 1 wherein the wood flour comprises eucalyptus wood flour.

9. The composite material of claim 1 wherein the wood flour comprises post-consumer wood flour.

10. The composite material of claim 1 wherein the wood flour comprises at least one member selected from a group consisting of pine wood flour, eucalyptus wood flour and post-consumer wood flour.

11. The composite material of claim 1 comprising at least 54 percent wood content.

12. The composite material of claim 11 having resistance against bacteria with efficiency higher than 99.99 percent.

13. The composite material of claim 1 comprising:
    1 to 2 percent of the protective master;
    1 to 3 percent of the internal lubricant;
    30 to 40 percent of the HDPE;
    13 to 18 percent of the mineral material;
    40 to 50 percent of the wood flour; and
    3 to 5 percent of the pigment.

14. A composite material comprising:
    1 to 3 percent of a mixture of nanoparticles and high density polyethylene (HDPE) crystals wherein the nanoparticles comprise silver and zinc;
    1 to 4 percent of a mixture of fatty acid esters;
    2 to 8 percent of a lubricant;
    26 to 43 percent of recycled high density polyethylene (HDPE);
    13 to 20 percent mineral material; and
    30 to 54 percent wood flour.

15. The composite material of claim 14 wherein the 1 to 3 percent of a mixture of nanoparticles and high density polyethylene (HDPE) crystals comprises 6 parts of the nanoparticles.

16. The composite material of claim 14 wherein the 1 to 3 percent of a mixture of silver nanoparticles, zinc nanoparticles and high density polyethylene (HDPE) crystals comprises 10 parts of the HDPE crystals.

17. The composite material of claim 14 wherein the 1 to 3 percent of a mixture of nanoparticles and high density polyethylene (HDPE) crystals comprises the nanoparticles having approximately equal parts of silver and zinc.

* * * * *